United States Patent [19]

Royer et al.

[11] 3,912,611
[45] Oct. 14, 1975

[54] FILM MATERIAL AND DEVICES USING SAME

[75] Inventors: William Anthony Royer, North Plainfield; Louis Richard Testardi, Warren; Jack Harry Wernick, Madison, all of N.J.

[73] Assignee: Bell Telephone Laboratories, Incorporated, Murray Hill, N.J.

[22] Filed: Mar. 12, 1973

[21] Appl. No.: 339,768

[52] U.S. Cl. ............... 204/192; 30/350; 161/213; 161/225; 174/68.5; 331/94.5 R; 338/307; 427/62; 427/101; 427/124; 427/250; 428/337; 428/469
[51] Int. Cl.² ............... C23C 5/00; B44C 1/18
[58] Field of Search ............ 204/192; 161/213, 225; 117/201, 212; 30/346.53, 346.54, 350; 29/194, 198

[56] References Cited
UNITED STATES PATENTS

| | | |
|---|---|---|
| 3,754,987 | 8/1973 | Purdes .............................. 117/212 |
| 3,774,703 | 11/1973 | Sanderson ........................... 204/192 |
| 3,829,969 | 8/1974 | Fischbein et al. ................... 204/192 |

OTHER PUBLICATIONS

45, Zeit. Metallkunde, 23 (1954).

Metals Handbook, T. Lyman, ASM, Cleveland, pp. 93–105 (1948 edition).

*Primary Examiner*—Oscar R. Vertiz
*Assistant Examiner*—Wayne A. Langel
*Attorney, Agent, or Firm*—P. V. D. Wilde; G. S. Indig

[57] ABSTRACT

Film materials produced by low temperature deposition show a variety of device-significant properties. Film compositions center about the nominal formulae $Mo_5Ru_3$ and $W_3Ru_2$. Films, conveniently deposited by sputtering, show high values of hardness, corrosion resistance, and reflectivity. Resistivities, as well as temperature coefficient of resistance, may be varied over a broad range dependent upon deposition temperature.

13 Claims, 8 Drawing Figures

3,912,611

FILM MATERIAL AND DEVICES USING SAME

BACKGROUND OF THE INVENTION

1. Field of the Invention

The invention is concerned with supported films which may serve a variety of purposes—e.g., passivation, corrosion resistance, hardness, etc.

2. Description of the Prior Art

Modern devices utilize an extremely broad range of film materials. Compositionally, they range from organic polymers to inorganic or refractory oxides. Device use is just as varied and depends on properties such as passivation, lubrication and corrosion resistance.

A catalog of materials and their use would be far too extensive for these purposes. Such a catalog would include elemental films, such as gold, for use as electrical contacts; alloy films, such as tantalum nitride, for use as resistors; deposited oxide films, such as silica, for use as passivating layers; in situ oxidized films, such as tantalum oxide, for use as capacitor dielectrics; polymer films, such as polytetrafluoroethylene, for use as lubricating layers, etc.

SUMMARY OF THE INVENTION

Intermetallic films of molybdenum and ruthenium or tungsten and ruthenium deposited at low temperature, for example, by sputtering, manifest a variety of film properties of device interest. Such films are of the nominal composition $Mo_5Ru_3$ and $W_3Ru_2$; and appropriate compositions centering about these atomic formulae may deviate by ± 20 atomic percent so that they may more generally be represented as $Mo_{4\ to\ 6}Ru_3$ and $W_{2.4\ to\ 3.6}Ru_2$. Films are typically deposited by sputtering with the film temperature during deposition within the range of from about 400°C to about 700°C although a more general range is from about 100°C to 1000°C. Optimization of certain properties for certain uses may dictate deposition outside of this indicated range. Properties of device interest include, inter alia, a hardness value approaching that of sapphire; resistance to many acidic and caustic media; reflectively throughout the visible spectrum approaching that of aluminum; and tailorable values of resistivity and temperature coefficient of resistance to suit a variety of circuit needs.

DETAILED DESCRIPTION

Film Composition

Figure 1:
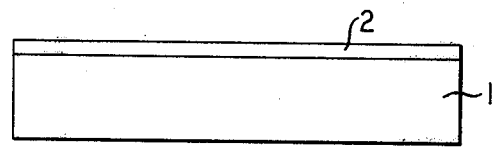
FIG. 1 is a front elevational view of a supported film of a composition of the invention.

For expediency, the invention is discussed in terms of the nominal compositions $Mo_5Ru_3$ and $W_3Ru_2$. While these nominal formulae do indicate atom ratios of the indicated elements, they are not intended as further indication of the nature of the film materials. For example, it has not been determined that the compositions are true, fixed, intermetallic compounds. In fact, device properties are of interest for the entire range of compositions which may be described in terms of the formulae $Mo_{4\ to\ 6}Ru_3$ and $W_{2.4\ to\ 3.6}Ru_2$.

Films of the invention are conveniently prepared by sputtering, utilizing targets of the compositions indicated above. Such targets may have surfaces of sigma phase bulk material or may be constituted, for example, of fine particulate mixtures of the indicated elements or of other composition which will yield the film materials.

Compositions as set forth above are the "essential" compositions of the invention. Various device uses may dictate admixture to enhance such properties as: specified adsorptions for particular wavelengths of electromagnetic radiation; fluorescence; magnetic properties; adhesion, etc.

Structure

Inventive properties are intimately associated with film structure. The phase of the film has not been positively identified but is believed to be a low temperature phase differing from that of the sigma phase associated with bulk material necessarily prepared or processed at high temperatures. Properties are not due to the two-dimensional nature of the films and are found to persist, in fact, to be substantially invariant, for the whole range of thicknesses of from a fraction of a micrometer to many micrometers (e.g., 300 Angstroms to 10μM). Device properties are dependent upon deposition temperature so, for example, temperature coefficient of resistance may, under certain circumstances, be varied from a negative to a positive value by changing deposition temperature.

Bulk materials of composition corresponding with the films of the invention have been reported. See, for example, 11, *A.I.M.E. Met. Soc. Conf.*, 383 (1961); 45, *Zeit. Metallkunde*, 23 (1954). Reported bulk properties, while attractive, differ from and are generally inferior to those of the films. For example, the Knoop hardness values for bulk samples of $Mo_5Ru_3$ and $W_3Ru_2$ are 1200 and 600, respectively, as compared with typical film values of 1600 and 2400.

Film Preparation

The parameter of greatest significance is deposition temperature. Depending upon desired film properties, film temperature during deposition is ordinarily within the range from about 400°C to 700°C; although, for some purposes, film temperature may be as low as 100°C or as high as 1,000°C. While other procedures may result in deposition at temperatures within this range, commercial practice will likely take the form of sputtering. An advantage of sputtering over, for example, evaporative vapor deposition is the ability to maintain composition during steady state conditions by use of a target of the precise desired film composition. Vacuum evaporation or use of carrier systems may be complicated by the varying volatilities of the components of the elemental or compound precursor source. Procedures for maintaining composition constant despite varying volatility are, however, known. See, for example, U.S. Pat. No. 3,321,278.

A type of sputtering found to be particularly convenient for deposition of a variety of films including those of the invention is known as getter sputtering. This procedure, now in general usage, makes use of an arrangement which removes contaminants from the incoming atmosphere before contact is made with any of the elements essential to the sputtering procedure. See, for example, 35, *Journal of Applied Physics*, 554 (1964) for a description of this procedure.

Sputtering targets contain essential ingredients identical in character and amount with those indicated by the general film formulae $Mo_{4\ to\ 6}Ru_3$ and $W_{2.4\ to\ 3.6}Ru_2$. Intentional ingredients designed to alter film properties to suit particular device needs may be included in the target. High purity is not required for the described properties of the essential compositions, and normal practice maintaining a target purity of 99 percent with respect to unintentional contaminants is sufficient. Targets may be prepared, for example, by arc melting, thereby generally resulting in sigma phase bulk material; or they may be fabricated by other means, such as, from particulate material which may be dry pressed and/or sintered to increase homogeneity.

Sputtering atmosphere is also non-critical and usual inert gases—such as, argon, helium, and neon—are suitable.

The range of deposition temperature has been noted. Sputtering conditions are otherwise conventional and, given conditions, are both dependent on apparatus and interdependent on other operating parameters. By way of example, materials described were deposited over voltage ranges of 1,000 to 2,000 volts as measured between anode and target; and currents for pressures over the range of from 50 to 100 micrometers of mercury varied from 3 to 15 milliamperes. Typical deposition rates varied from 100 to 300 Angstrom units per minute. By way of example, properties reported in some of the attached Figures were measured on film produced as follows:

$Mo_5Ru_3$: 2,000 volts, 6 milliamperes, 51 micrometers of argon pressure—yielding a deposition rate of 260 Angstrom units per minute.

$W_3Ru_2$: 2,000 volts, 10 milliamperes, 72 micrometers of Hg pressure—yielding a deposition rate of 206 Angstrom units per minute. Films produced were typically of a thickness of from 0.3 to 10 micrometers although both thinner and thicker films manifest similar properties.

Measured film properties are related to deposition temperature. These properties were measured on films deposited on substrates heated by conduction from electrically heated substrate supports. Temperatures are those of the film being deposited as determined by pyrometer measurement (as compared with thermocouple-measured support temperatures). It was determined that temperature gradients between heated support and film lie within the limits of from 100°C to 250°C. Some measured results were expedited by use of shaped supports designed to result in a temperature gradient within a single film being deposited.

Substrate

Film compositions were found to be highly adherent. Suitable substrate materials are chosen to be suitable for intended device use; and, of course, all substrate materials must be capable of withstanding deposition conditions. Where films are to serve as circuit elements, substrate materials are necessarily insulating. Where usage contemplates exposure to high temperature or corrosive atmosphere, substrates should be capable of withstanding either condition.

While the general nature of the description is, in part, based on experiments in which substrate compositions were varied, many of the reported results are based on use of a "standard" substrate. For these purposes, films were deposited on sapphire. This standard substrate was processed in a variety of ways depending upon parameters to be measured. For example, for reflectivity measurements, processing included mechanical polishing to result in a substrate surface smoothness at least of the order of the intended film thickness—e.g., 1 micrometer or better. A variety of cleaning procedures utilized any of the steps of washing in boiling phosphoric acid, air baking, washing in alcohol, et cetera.

1. Hardness

Hardness values are those of the Knoop hardness scale. See, for example, *Metals Handbook*, edited by T. Lyman, ASM, Cleveland, page 93 (1948 edition).

Figure 6:
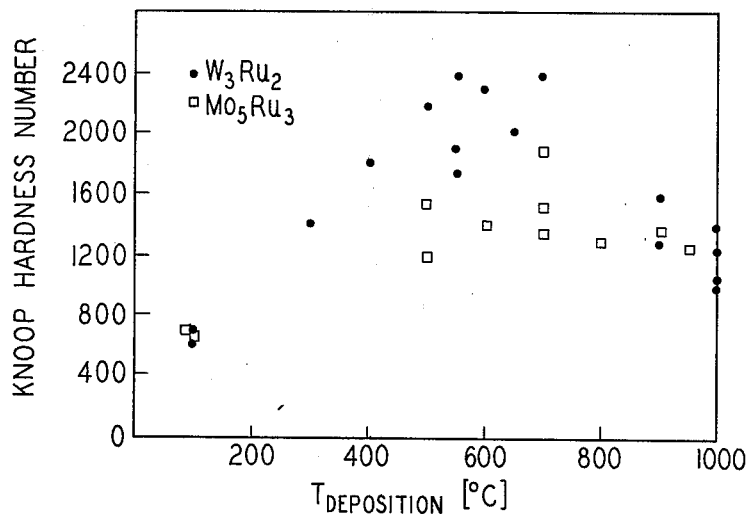
FIG. 6, on coordinates of Knoop hardness number and deposition temperature, is a plot showing the relationship between these parameters for materials of both nominal compositions of the invention.

Hardness values on both nominal compositions as a function of deposition temperature are shown in FIG. 6. As seen from this FIG., hardness increases with increasing deposition temperature up to about 500°C. Higher temperatures result in no further increase and sometimes in a slight decrease.

While a variety of conditions have been utilized, values reported on FIG. 6 are for films of a thickness of about 10 micrometers utilizing measuring weights of from 2 to 50 grams. Depth of the impression left by the indentor was generally less than 5 percent of the film thickness. Values reported are averages of about five measurements with a mean variation largely due to surface roughness within an approximate range of from ±10 to ±20 percent.

Measured hardness value depended somewhat on the load used. Typical increase in the load by a factor of five resulted in a hardness reduction of about 15 percent. Substrate effects are, of course, more significant for heavier loads and the light-load tests are considered more nearly indicative of the inherent film character. A variety of hardness values are shown in FIG. 6. A brief summation is set forth in Table I.

TABLE I

| Composition | (Detailed Value Set Forth in FIG. 6) Deposition Temperature | Hardness |
|---|---|---|
| $Mo_5Ru_3$ | 100 degrees C | 600–700 |
| $Mo_5Ru_3$ | 500 degrees C | 1200–1500 |
| $W_3Ru_2$ | 100 degrees C | 600–700 |
| $W_3Ru_2$ | 550 degrees C | 1500–2400 |

2. Etch Resistance

This parameter is reported in Tables II and III. Etch resistance was determined by measuring weight loss after immersion in the etchant for 15 minutes. Etchants used included a variety of common acids and bases. Measurements were conducted at room temperature and at about 100°C.

$Mo_5Ru_3$ films used for the reported tests were 4,000 Angstrom units thick and weighed about 180 micrograms. $W_3Ru_2$ films were 3,000 Angstrom units thick and weighed about 200 micrograms. Reported weight loss measurements were estimated to be of a precision of ± 5 micrograms.

TABLE II

ETCH RESISTANCE OF $W_3Ru_2$

| Films | Etches Conc. except as noted | wt. Loss [μg/sec./cm²] | Thickness Reduction [A/sec.] |
|---|---|---|---|
| 3000A Thick wt. ~200 μg | | | |
| Deposition Temp ~200°C | Cold 3HC1–1HNO₃ | 0 | 0 |
| | Cold HC1 | 0 | 0 |
| | Cold NH₄OH | 0 | 0 |
| | Cold H₂O₂ | 0 | 0 |
| | Hot HNO₃ | 0 | 0 |
| | Hot H₃PO₄ | 0 | 0 |
| | Hot HF | 0 | 0 |
| | Hot H₂SO₄ | 0 | 0 |
| | Hot NH₄OH | 0.0854 | 0.52 |
| | Hot 1HF–1HNO₃ | 0.121 | 0.73 |
| | Hot H₂O₂ | 0.14 | 0.85 |
| | Hot HC1 | >0.55 | >3.33 |
| | Hot 3HC1–1HNO₃ | >0.55 | >3.33 |
| | Hot 2NH₄OH–1H₂O₂ | 2.07 | 12.5 |
| Deposition Temp ~550°C | Cold 2NH₄OH–1H₂O₂ | 0 | 0 |
| | Hot 1HF–1HNO₃ | 0.012 | 0.075 |
| | Hot 3HC1–1HNO₃ | 0.126 | 0.77 |
| | Hot 2NH₄OH–1H₂O₂ | 0.33 | 2.0 |
| | 60°C NaOH (sat. sol.) | 0.076 | 0.46 |
| | 100°C NaOH (sat. sol.) | >0.55 | >3.33 |

TABLE III

ETCH RESISTANCE OF $Mo_5Ru_3$

| Films | Etches Conc. except as noted | wt. Loss [μg/sec./cm²] | Thickness Reduction [A/sec.] |
|---|---|---|---|
| 4000A Thick wt. ~180 μg | | | |
| Deposition Temp ~100°C | Cold 3HC1–1HNO₃ | 0 | 0 |
| | Hot H₃PO₄ | 0 | 0 |
| | Cold H₂O₂ | 0 | 0 |
| | Cold HNO₃ | 0 | 0 |
| | Cold H₂SO₄ | 0.022 | 0.2 |
| | Cold HC1 | 0.025 | 0.23 |
| | Cold HF | 0.028 | 0.25 |
| | Cold NH₄OH | 0.025 | 0.23 |
| | Hot NH₄OH | 0.047 | 0.42 |
| Deposition Temp ~300°C | Hot 3HC1–1HNO₃ | >0.47 | >4.4 |
| Deposition Temp ~450°C | Hot HC1 | 0 | 0 |
| | Cold 1HF–1HNO₃ | 0 | 0 |
| | Cold 2NH₄OH–1H₂O₂ | 0 | 0 |
| | Cold HF | 0 | 0 |
| | Hot 2NH₄OH–1H₂O₂ | 0 | 0 |
| | 25°C NaOH (half sat. sol.) | 0 | 0 |
| | 100°C NaOH (half sat. sol.) | 0 | 0 |
| | 25°C NH₄OH | 0 | 0 |
| | 90°C NH₄OH | 0 | 0 |
| | 25°C NaOH (sat. sol.) | 0 | 0 |
| | 60°C NaOH (sat. sol.) | 0 | 0 |
| | 100°C NaOH (sat. sol.) | 0.025 | 0.27 |
| Films | Acids | Wt. Loss [μg/sec./cm²] | Thickness Reduction [A/sec.] |
| 4000A Thick wt ~180 μg | | | |
| Deposition Temp ~450°C | Cold 2H₂SO₄–1H₂O₂ | 0.0055 | 0.05 |
| | Cold 1HF–1HC1 | 0.011 | 0.1 |
| | Hot H₂O₂ | 0.016 | 0.15 |
| | Hot HNO₃ | 0.033 | 0.3 |
| | Hot H₂SO₄ | 0.033 | 0.3 |
| | Hot 3HC1–1HNO₃ | 0.050 | 0.45 |
| Deposition Temp ~600°C | Hot 3HC1–1HNO₃ | 0.040 | 0.33 |

Films of both compositions deposited at a variety of temperatures showed essentially no attack in most acidic media at room temperature. Fifteen minute immersion produced no signs of flaking and no loss of original bright, metallic luster.

Etch resistance for a number of acids was unimpaired at temperatures close to the boiling point of the etchant (about 100°C). Etch resistance, like hardness, increases with deposition temperature at least to temperatures of the range of 450°C to 600°C. For $W_3Ru_2$, the greatest rate of attack (about 2 Angstroms per second) is from hot $2NH_4OH-1H_2O_2$ and (0.77 Angstroms per second) from hot aqua regia.

Best etch resistance is shown by $Mo_5Ru_3$ deposited at about 450°C. Greatest attack (0.3 to 0.45 Angstroms per second) is from hot aqua regia.

3. Electrical Resistivity

Figure 7:
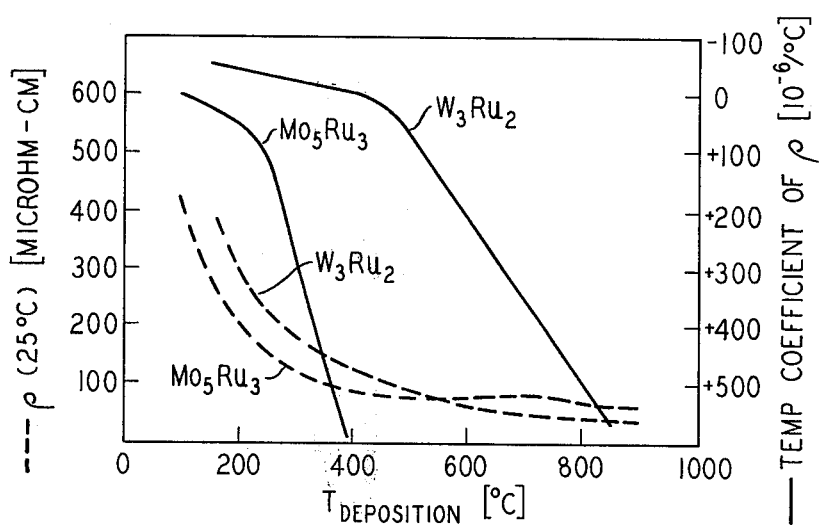
FIG. 7, on alternate ordinate parameters of resistivity and temperature coefficient of resistance and on abscissa values of deposition temperature, is a plot showing the relationship of these parameters for both categories of compositions in accordance with the invention.

Electrical resistivity ρ and temperature coefficient of resistance both as a function of deposition temperature are plotted on FIG. 7. Measurements were made by a standard four-point probe using small ac currents. Film thicknesses were in the range of from 1 to 2 micrometers. Figures plotted reflect measurements made at 25°C. Additional measurements were made in liquid nitrogen and liquid helium. Superconducting transition temperatures were also recorded as later noted.

The temperature coefficient of resistance plotted reflects the change over the 220°C interval from 25°C down to −195°C. Accordingly this ordinate unit is defined as its $$\frac{\rho\ 25°C - \rho\ -195°C}{\rho\ 25°C \times 220}$$

It is postulated that the dropping value in resistivity between deposition temperatures of 25°C and 400°C arises from the concomitant increase in grain size. While, as indicated, measurements were made on specimens of uniform film thickness, other measurements indicated resistivity to be independent of thickness over the range of from 1 micrometer to 10 micrometers. Temperature coefficient of resistance is nearly zero for the molybdenum-containing material and is somewhat negative for the tungsten-containing material. As seen from the FIG., both temperature coefficients increase with increasing deposition temperatures reaching a maximum of from 500 to 1,000 ppm at $T_D = 1,000°C$.

4. Optical Reflectivity

Reflectivity was measured over wavelengths of from 0.3 to 20 micrometers using a double beam spectrometer. Reflectivity values plotted on FIG. 8 as a function of wavelength were normalized to aluminum. (Aluminum has a reflectivity of 90 percent or greater over most of the spectral range studied.) Film thicknesses were about 2,000 Angstrom units. Films were all deposited at 100°C. Other observations show substantial independence of reflectivity as a function of deposition temperature. As noted, reflectivity was good over the entire spectral range for which data is presented with little structure except near a wavelength of 8,000 Angstrom units.

5. Superconductivity

Both compositions were superconducting with higher values of transition temperature $T_c$ corresponding with lower deposition temperatures. $T_c$ for $Mo_5Ru_3$ was about 8°K for $T_D$ of from 70°C to about 600°C. The corresponding $T_c$ value for $W_3Ru_2$ was about 4.8°K. At higher deposition temperatures, $T_c$ dropped finally attaining values below 4.2°K for $T_D$ about 900°C.

THE FIGURES

FIG. 1 depicts a substrate 1, constructed, for example, of sapphire, coated with a film 2 of nominal essential composite $Mo_5Ru_3$ and $W_3Ru_2$.

Figure 2:
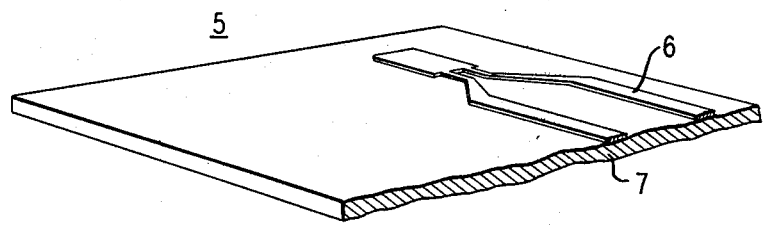
FIG. 2 is a perspective view of a portion of an integrated circuit including elements constructed of film material herein.

FIG. 2 depicts a broken section of an integrated circuit 5 including two resistors 6 and 7 constructed of a film material of the invention.

Figure 3:
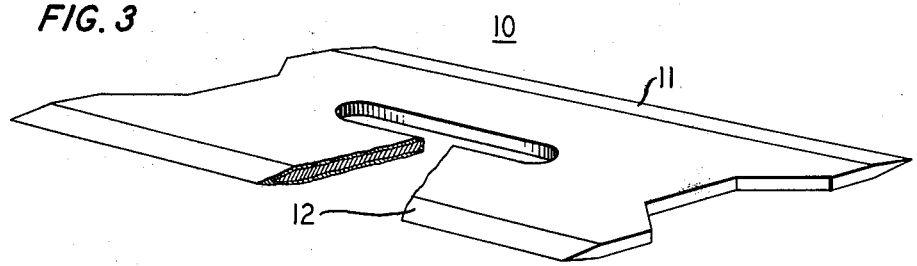
FIG. 3 is a perspective view, partly in section, of a cutting implement coated with a film composition in accordance with the invention.

FIG. 3 depicts an ordinary razor blade 10 including cutting edges 11 and 12 coated again by one of the compositions herein.

Figure 4:
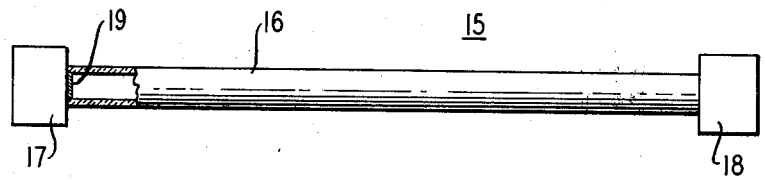
FIG. 4 is a front elevational view, partly in section, of a laser within a cavity defined by reflective surfaces, at least one of which is constructed of a film of the invention.

FIG. 4 schematically depicts a laser 15 which includes an active medium 16 and end members 17 and 18 at least one of which has an inner surface, such as 19, which is coated by a material herein. Laser medium 16 may be a corrosive gaseous material such as a high temperature gas. Pump means, possible circulation means, etc., necessary for laser operation are not depicted.

Figure 5:
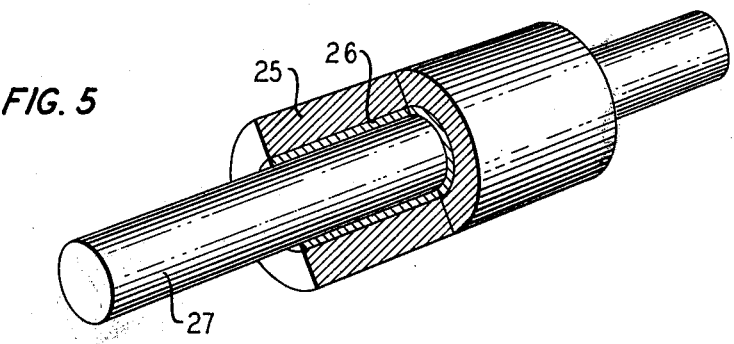
FIG. 5 is a perspective view, partly in section, of apparatus including a bearing surfaced by a film of the invention.

FIG. 5 shows a portion of a bearing 25 inner surface 26 of which is coated by a material of the invention. Closely fitting rotatable member 27 is designed to rest on bearing surface 26.

Figure 8:
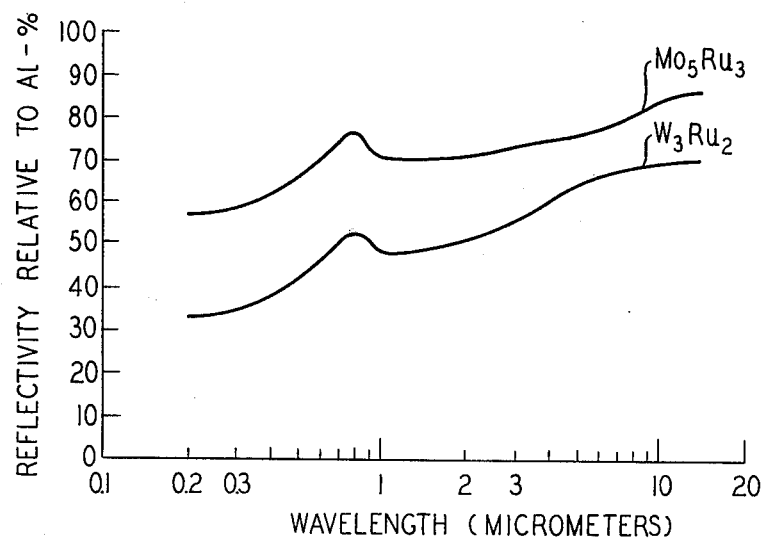
FIG. 8, on coordinates of reflectivity relative to deposited aluminum on the ordinate and wavelength on the abscissa, is a plot relating these parameters for both film compositions of the invention.

FIGS. 6–8 graphically depict certain of the film properties discussed and have been described in conjunction with the related text portions of the detailed depositions.

What is claimed is:

1. Article including a substrate supporting a film having a thickness of from 300 Angstrom units to 10 micrometers, and characterized in that the composition of the film consists essentially of material of a stoichiometry selected from the group consisting of compositions represented by the formulae $Mo_{4\ to\ 6}Ru_3$ and $W_{2.4\ to\ 3.6}Ru_2$, in which the subscripts in the said formulae represent relative numbers of atoms, and which film is deposited by evaporation or sputtering at a temperature of from 400°C to 1,000°C.

2. Article of claim 1 in which the said film is patterned.

3. Article of claim 2 in which portions of the said film comprise a printed electrical circuit and in which said portions are electrically connected within the said circuit.

4. Article of claim 3 in which the said film is $W_{2.4\ to\ 3.6}Ru_2$ and in which said portions are resistor elements, the resistance of said elements exceeding that of the electrical connections.

5. Article of claim 1 in which the said film is a sputtered film.

6. Article of claim 5 in which the said temperature range is from 400°C to 700°C.

7. Article of claim 1 in which the said substrate includes at least one cutting edge.

8. Article of claim 1 in which the said film is a bearing surface for a moving member.

9. Article of claim 1 in which the said film is a reflecting cavity member of an optical cavity.

10. Article of claim 9 in which the said cavity is a laser cavity.

11. Article of claim 1 in which the said temperature range is from 400°C to 700°C.

12. Process for fabricating a body of a composition selected from the group consisting of compositions represented by the formulae $Mo_{4\ to\ 6}Ru_3$ and $W_{2.4\ to\ 3.6}Ru_2$, in which the subscripts in the said formulae represent relative numbers of atoms, characterized in that the said body is prepared as a sputtered film by sputtering on a substrate with the said film maintained at a temperature of from 400°C to 1,000°C during sputtering and in which sputtering is carried out from a target, the exposed surface of which is of a composition essentially identical to that of the said body.

13. Process of claim 12 in which the said temperature range is from 400°C to 700°C.

* * * * *